United States Patent [19]

Mailloux et al.

[11] Patent Number: 4,661,859
[45] Date of Patent: Apr. 28, 1987

[54] PULSE WIDTH MODULATION GREYSCALE SYSTEM FOR HALFTONE PRINTER

[75] Inventors: Louis D. Mailloux, Fairport; Brian L. Waldron, Webster, both of N.Y.

[73] Assignee: Xerox Corporation, Stamford, Conn.

[21] Appl. No.: 270,079

[22] Filed: Jun. 3, 1981

[51] Int. Cl.[4] .................. H04N 1/23; H04N 1/40
[52] U.S. Cl. ..................... 358/283; 358/298
[58] Field of Search ............. 358/298, 283, 78; 369/53, 54

[56] References Cited

U.S. PATENT DOCUMENTS

| | | | |
|---|---|---|---|
| 3,681,650 | 8/1972 | Koll | 315/30 |
| 3,715,475 | 2/1973 | Prause et al. | 358/260 |
| 3,739,084 | 6/1973 | Heinrich | 358/283 |
| 3,916,096 | 10/1975 | Everett et al. | 358/283 R |
| 4,136,360 | 1/1979 | Hoffrichter et al. | 358/80 |
| 4,185,304 | 1/1980 | Holladay | 358/298 |
| 4,194,221 | 3/1980 | Stoffel | 358/283 |
| 4,196,451 | 4/1980 | Pellar | 358/283 |
| 4,232,344 | 11/1980 | Sakamoto | 358/298 |
| 4,234,250 | 11/1980 | Mailloux et al. | 355/4 |

*Primary Examiner*—Alan Faber
*Attorney, Agent, or Firm*—R. F. Chapuran

[57] ABSTRACT

A one dimensional electronic halftone generating system having a source of digital data representative of pixel greyscale, a counter to store the digital data, and pulse producing logic responsive to the counter to activate a laser modulator in accordance with the digital data representative of each pixel. In particular, a six bit data word represents one of 64 greyscale states for a particular pixel. The pulse producing logic responds to the particular data word to produce a pulse of a given duration or width to drive the laser for a given time period. The duration of the pulse, representing one to 64 states for a given pixel, will produce a given discrete greyscale value for each pixel.

4 Claims, 7 Drawing Figures

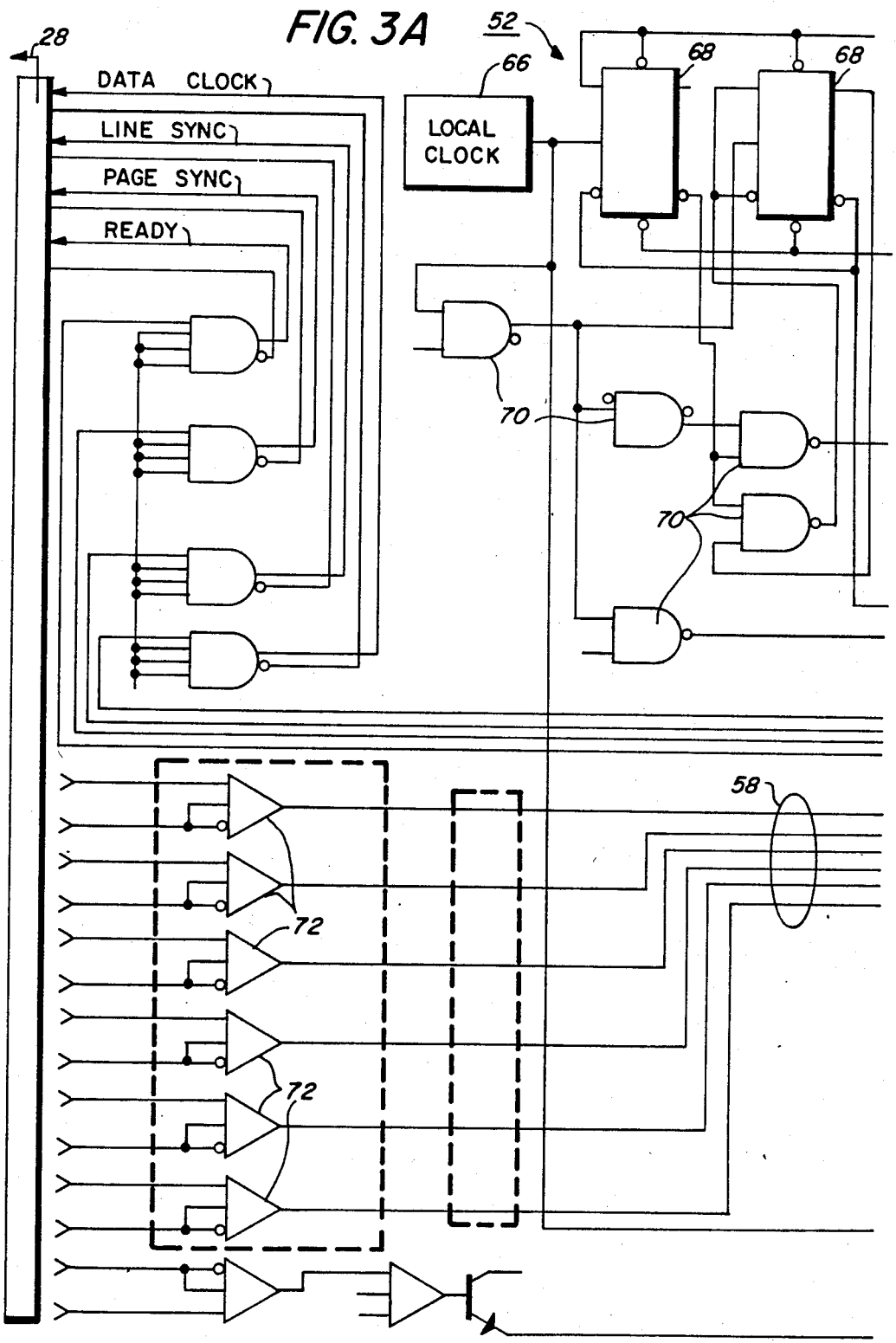

PULSE WIDTH MODULATION GREYSCALE SYSTEM FOR HALFTONE PRINTER

The invention relates generally to image reproduction by electronic halftoning and more particularly relates to a system including a pulse width modulation greyscale technique for producing electronic halftone images.

The process of reproducing a continuous toned image by a halftone representation is well known in the art. Some halftoning processes typically utilize optical screening techniques to produce the halftone cells. For example, in a screen having opaque rulings separating transmissive halftone cells, the cells were normally added optically to an image in order to form a resulting halftoned image. The optical halftone screen adds or multiples the image, cell by cell, by its transmittance function. The combined image is then thresholded onto an imaging member, such as a photographic film, to produce the halftoned image having areas of differing dot size. The size and shape of the halftone cell forming the final image is dependent upon the screen used and differing optical effects that are apparent in the final image can be modified by selective choice of a screen.

However, the advent of video scanning and electronic representation of an image brought the idea of electronic halftoning. Since an image can be generated electronically as a video signal, it is possible to generate an "electronic screen" or a signal representative of a screen to combine with the image signal. The combined signal would then be an electronic halftone image that could be outputted to a recording medium by a transducer. The electronic halftoning systems in the prior art have represented both analog and digital techniques.

Examples of prior art systems for electronic screening are shown in U.S. Pat. Nos. 3,916,096; 4,185,304; 4,194,221 and 4,196,451. These references describe both hardware and software two dimensional electronic screening systems for producing high resolution images (approximately 300 spots per inch or 2400 spots across the page). Unfortunately, high resolution systems areoften rather complex and expensive. A high degree of resolution and sophistication, however, is not always needed. This is true in reproducing relatively low resolution pictures in the order of 500-600 pixels across the page. It would, therefore, be desirable to provide a relatively simple and inexpensive one dimensional technique for providing electronic halftone images of relatively low resolution pictures.

In other prior art systems, it is possible to represent a pixel brightness using one byte of digital information. The degree of brightness represented by the byte of information for each pixel is then converted through a digital to analog converter to modulate a laser marker. The laser marker beam is then projected through a halftone screen to create a halftone image. This type of system is also relatively complicated due to the need for a halftone screen, the digital to analog converter and the need for more power to compensate for the attenuation of the laser beam through the screen. It would therefore be desirable to provide a simple, relatively inexpensive electronic imaging system that eliminates the need for a halftone screen and the need for digital to analog conversion.

It is therefore an object of the present invention to provide a new and improved electronic halftone imaging technique that is simple and economic. It is another object of the invention to provide one dimensional electronic halftone imaging technique that produces greyscale by means of pulse duration or pulse width rather than by pulse amplitude. It is a further object of the present invention to provide an electronic halftone imaging system for low resolution pictures that provides a periodic structure without the use of a halftone screen and that eliminates the digital to analog conversion. Further advantages of the present invention become apparent as the following description proceeds, and the features characterizing the invention will be pointed out with particularity in the claims annexed to and forming a part of this specification.

Briefly, the present invention is concerned with a one dimensional electronic halftone generating system having a source of digital data representative of pixel greyscale, a counter to store the digital data, and pulse producing logic responsive to the counter to activate a laser modulator in accordance with the digital data representative of each pixel. In particular, a six bit data word represents one of 64 greyscale states for a particular pixel. The pulse producing logic responds to the particular data word to produce a pulse of a given duration or width to drive the laser for a given time period. The duration of the pulse, representing one to 64 states for a given pixel, will produce a given discrete greyscale value for each pixel.

Another feature is a step wedge generator to automatically provide a sequence of greyscale signals to develop a test pattern for each of the 64 greyscale states and also a manual switch to provide a discrete greyscale state on a test pattern.

For a better understanding of the present invention, reference may be had to the accompanying drawings wherein the same reference numerals have been applied to like parts and wherein:

FIGS. 3A–3C are schematic pulse width modulators in accordance with the present invention.

DESCRIPTION OF THE PREFERRED EMBODIMENTS

Figure 1:
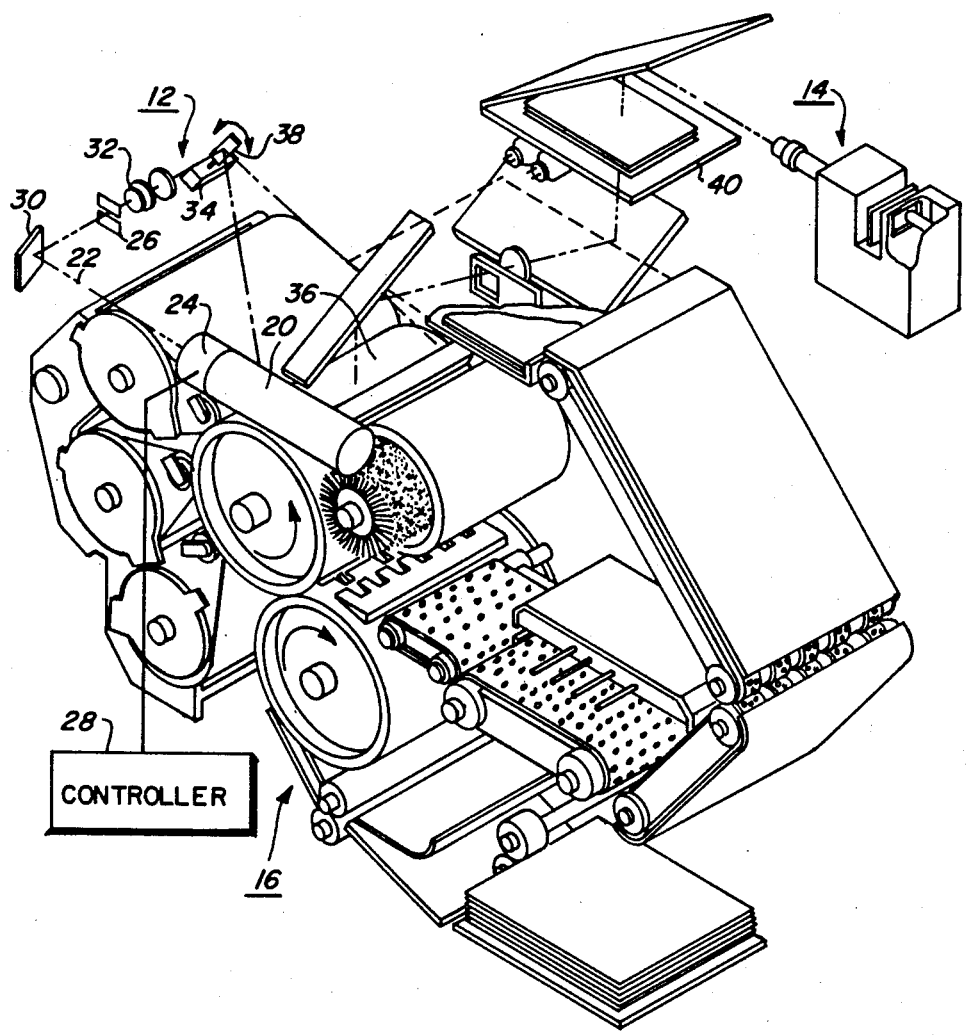
FIG. 1 is a perspective of a preferred embodiment of the laser exposing apparatus incorporating the present invention.

Referring now to FIG. 1, the electrophotographic color printing system of this invention is broadly shown as composed of laser exposure system 12, color transparency exposure system 14 and the remainder of the electrophotographic color printer 76. With reference to the laser exposure system 12, a laser 20 emits a beam of coherent radiation 22 which is modulated by acousto-optic modulator 24, in conjunction with slit and mask 26. The modulator is controlled by signals received from controller 28. Any suitable image scanning means may be used to produce binary code representing an original image stored in controller 28.

When modulator 24 is "off" the laser beam is masked by slit and mask 36. When modulator 24 is "on" the laser beam is diffracted, the zero order diffraction being masked and the first order diffraction passing through the slit.

The laser beam 22 modulated by modulator 24 is reflected (when "on") from mirror 30 through slit and mask 26, lens 32 to galvanometer optical scanner 34. Lens 32 serves to expand the laser beam and spot focus it at the photoreceptor surface 36. Mirror 38 provides for the horizontal laser scanning of the charged photoconductor surface 36.

Controller 28 can be any suitable processor which provides the required video information to modulator 24 in synchronization with the operation of printer 16. The video signal from the controller 28 to modulator 24 can come from any suitable source not only stored computer video signal information but also such information transmitted directly from an electrooptical scanner at a near or remote location.

Figure 2:
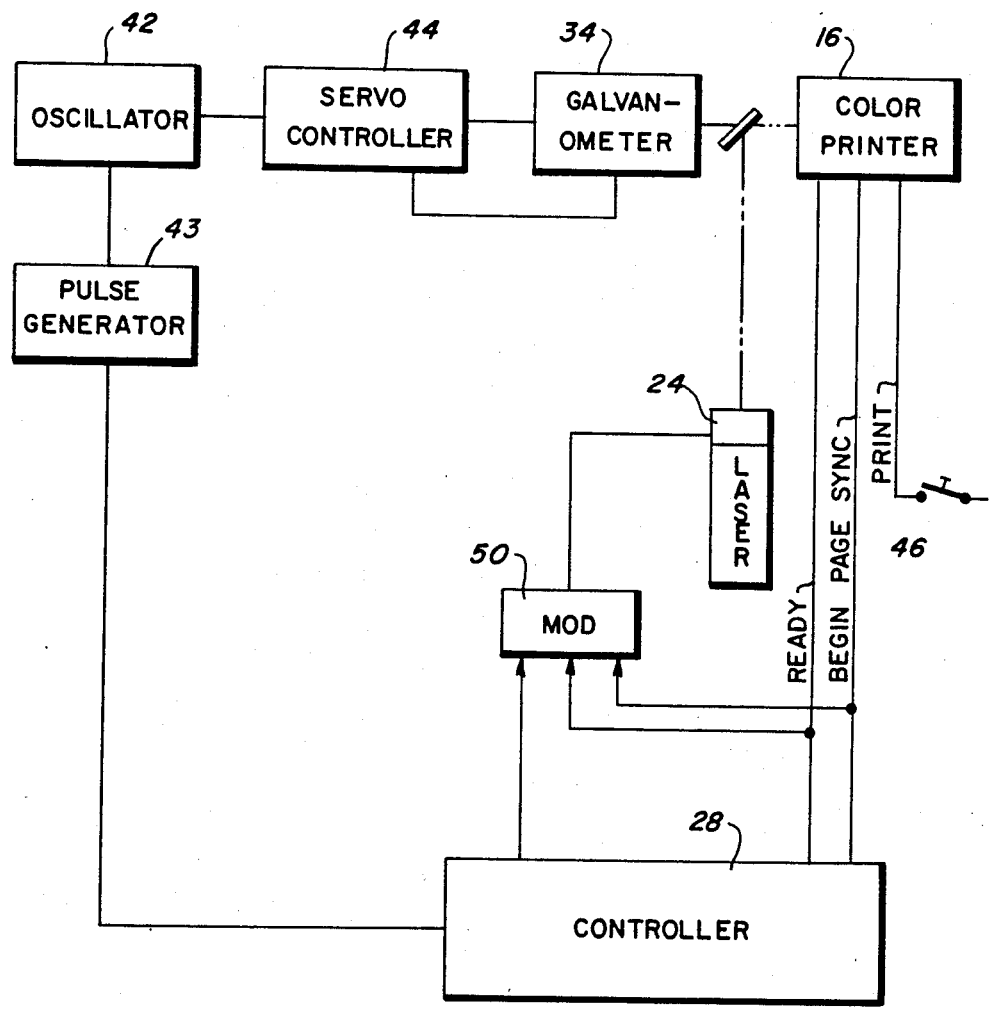
FIG. 2 is a block diagram showing the relationship and synchronization of the various components of the laser exposing apparatus.

Referring now to FIG. 2, oscillator 42 transmits a signal to pulse generator 43 and also transmits a sawtooth wave form to servo controller 44 which generates the signal to drive galvanometer 34. Galvanometer 34 is a moving iron galvanometer incorporating a position transducer which operates by detection of a capacitance variation between the rotating armature and a set of stationary electrodes designed specifically for closed-loop operation.

In accordance with the present invention, pulse width modulation circuitry 50 interconnects the controller 28 with the modulator 24. The circuitry 50 provides a signal to controller 28 for synchronizing the transmission of video signals to the modulator 24 with the operation of the galvanometer 34.

When remote print switch 46 is closed, a print signal is relayed to activate electrophotographic copier 16 which in turn generates a ready signal to controller 28 and to circuitry 50. Then when the scan exposure starts in electrophotographic copier 16, a begin page sync signal is transmitted to controller 28 and to circuitry 50 to synchronize transmission of video signals from controller 28 with the flow scan exposure of electrophotographic copier 16. This permits the placing of the data controlled laser beam information on predetermined portions of the final print.

For a more detailed description of the color printing system reference is made to U.S. Pat. No. 4,234,250, incorporated herein.

Figure 3B:
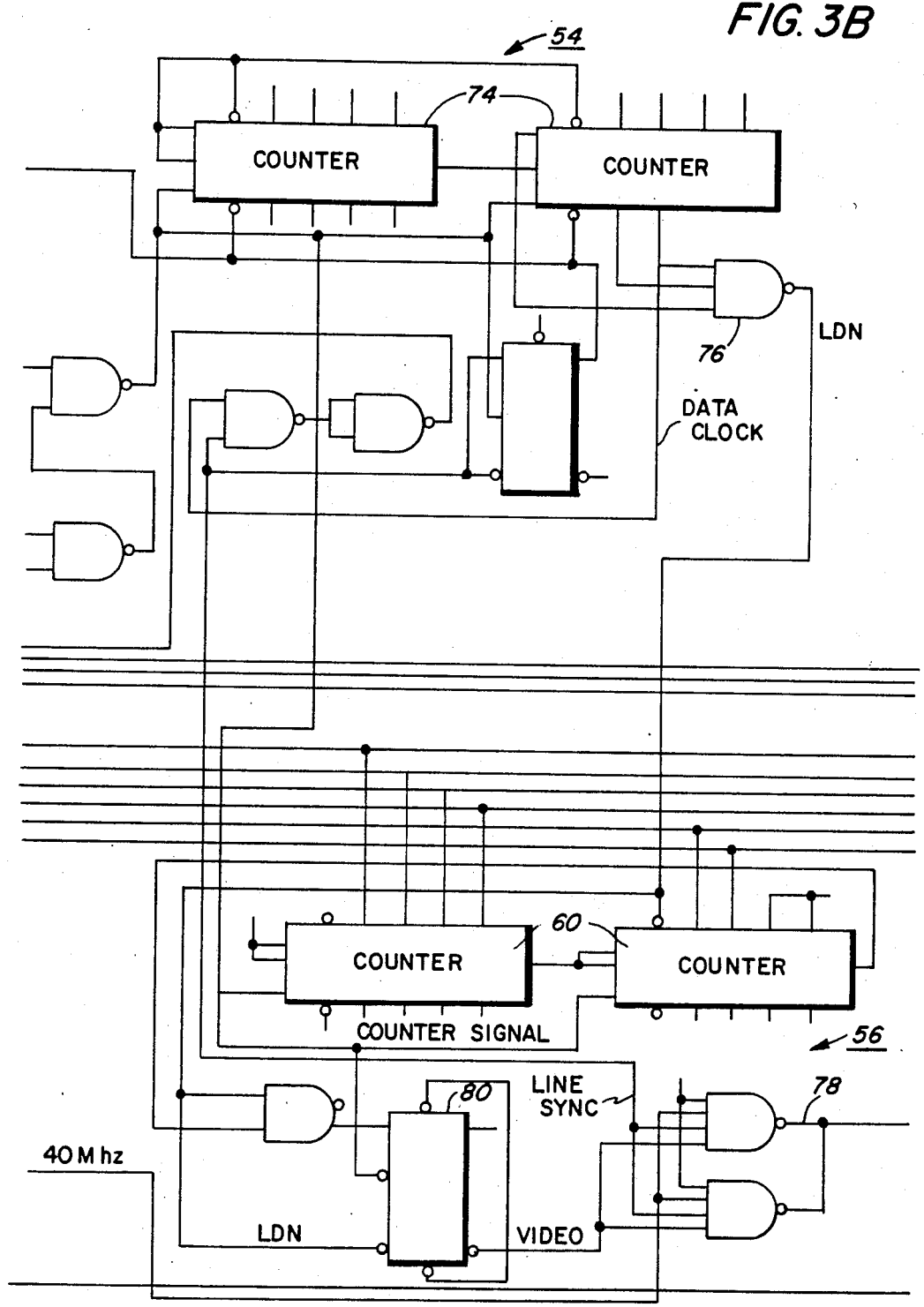
Figure 3C:
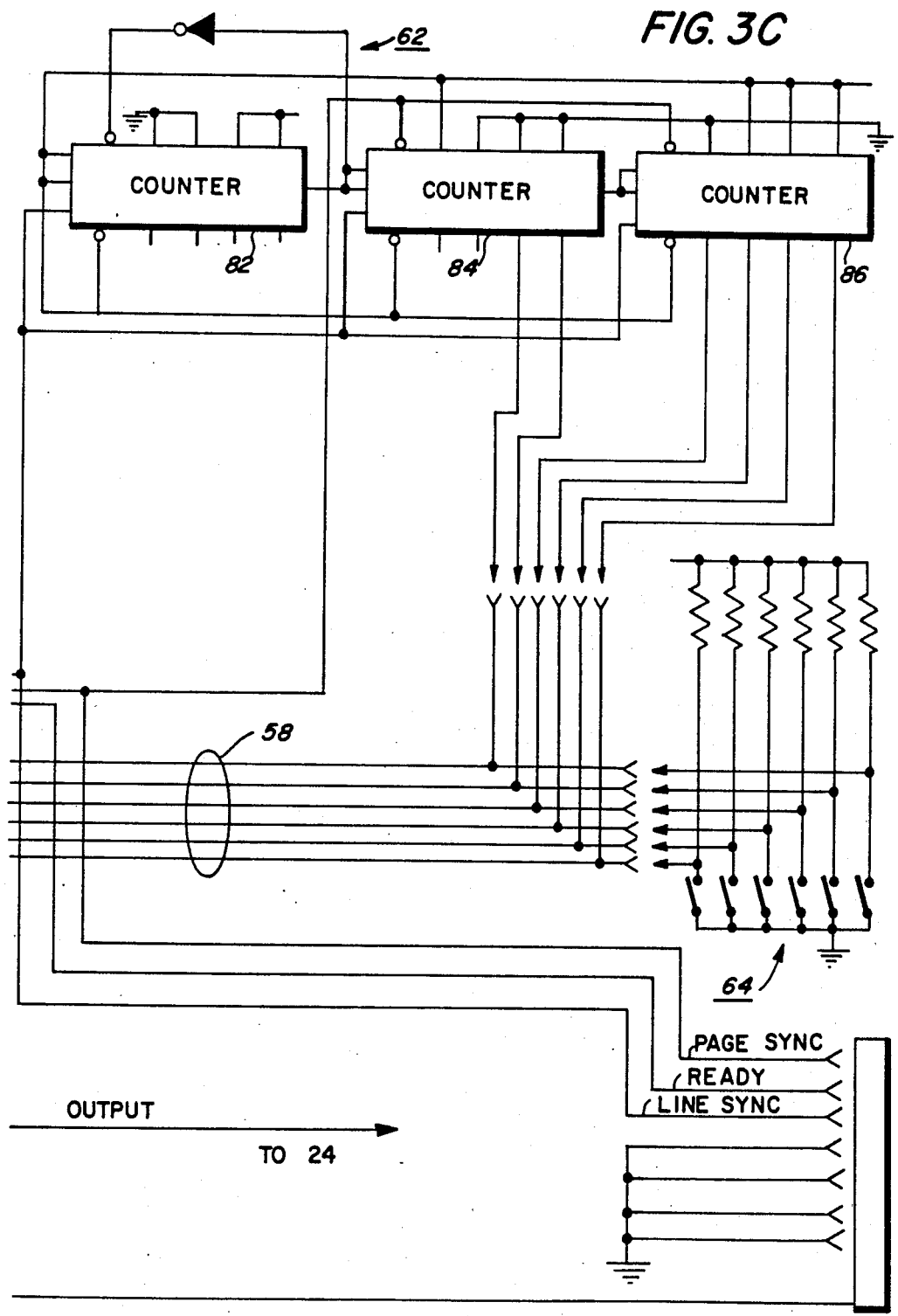

With reference to FIG. 3, there is shown the pulse width modulation circuitry 50, in accordance with the present invention. In particular, a clock generator 52 provides suitable clock pulses to the the divide by sixty four circuit 54 and the modulating circuitry 56 to synchronize video pulses out of the modulating circuitry 56 to the laser modulator 24. The controller 28 is interconnected to the data bus generally shown at 58 through the input gates 72. Six bit data words are conveyed from the controller 28 to the data bus 58 and loaded from the data bus into a six bit counter 60 in the modulating circuitry 56.

For test purposes, a step wedge generator 62 automatically provides a sequence of greyscale signals to develop a test pattern for monitoring system operation. Additionally, a manual switch 64 is provided to manually insert a particular greyscale value as an alternate means to monitor the system operation. In a particular embodiment, the step wedge generator 62 and the manual switch 64 are connected to the data bus 58 through jumper plugs. However, it should be noted that other means of interconnecting the step wedge generator 62 and the manual switch 64 are possible such as a switch mechanism.

With reference to the clock generator 52, a 40 megahertz local clock 66 provides a 40 megahertz carrier frequency for synchronizing laser modulation. The 40 megahertz carrier frequency is necessary to turn on and off the modulator 24. However, to have a suitable video rate, that is, the spacing of the pixels on a page or the horizontal resolution of the pixels, a slower frequency is required. Preferably this frequency is a multiple fraction of the carrier frequency. In a preferred embodiment, therefore, the clock generator 52, circuitry comprising flip flops 68 and AND gates 70 divides the 40 megahertz signal by 1.5 to provide a 26.67 megahertz signal. This signal is conveyed to the divide by sixty four circuit 54 and to the modulating circuitry 56. The 26.67 megahertz signal is, in effect, 64 times the video rate.

Figure 4:
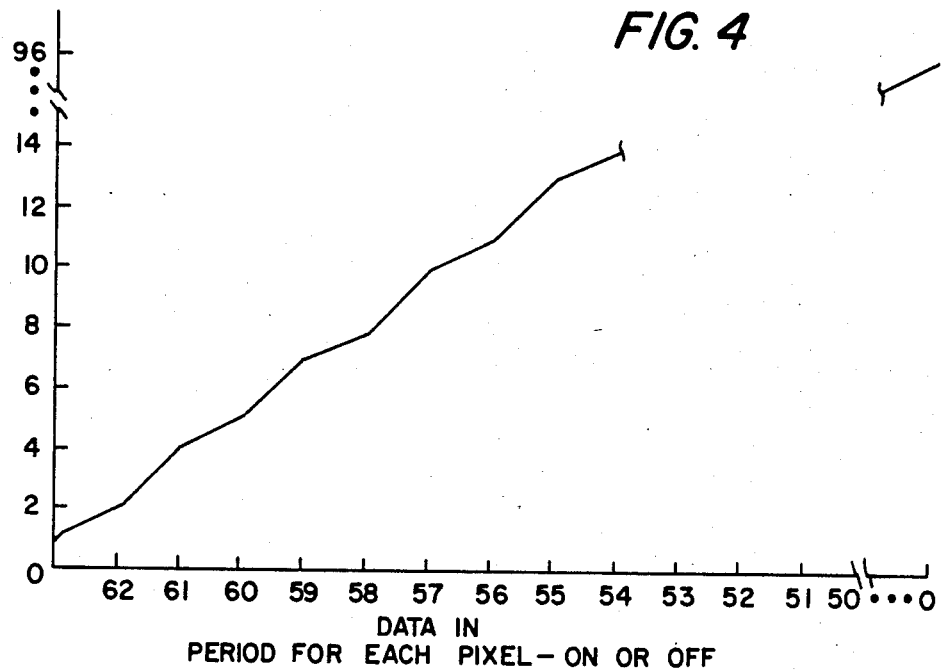
FIGS. 4 and 5 represent the relationship between the 64 pulse periods and the six bit data word input information.
Figure 5:
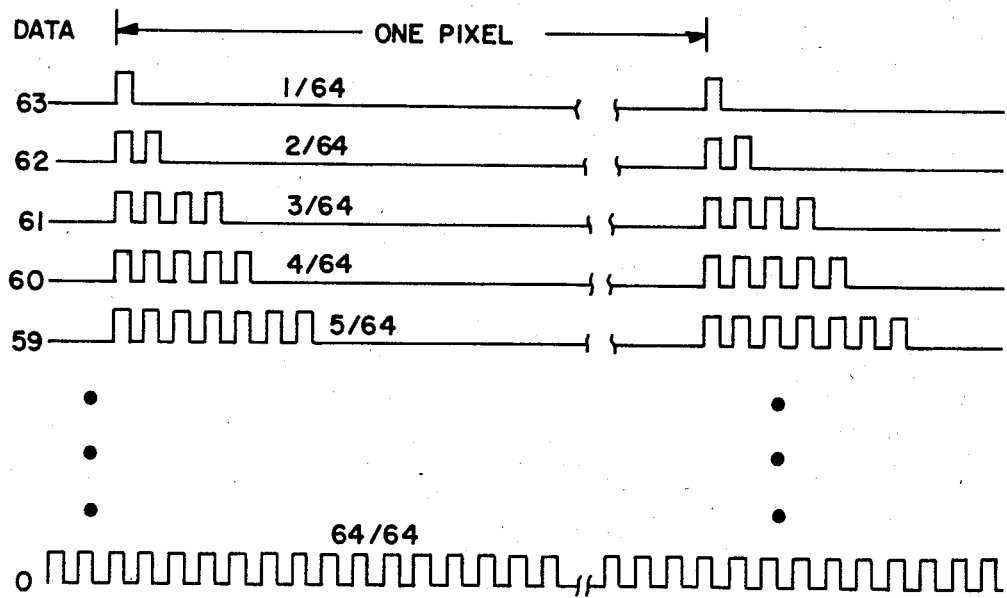

In accordance with the present invention, with reference to FIGS. 4 and 5, each pixel is divided up into 64 states. These states are represented as pulses, but in fact, the significance is in the time period that the laser is either on or off for each pixel. The length of time or the period of time that a laser is on or off for a particular pixel, depends upon the information contained in the data word provided for that particular pixel. With reference to FIG. 4, the X axis represents the number contained in the data word for each pixel and the Y axis represents the time period that the laser is on for that particular pixel. For example, if the data word contains the number 63, the laser will be on for only one period of the 64 available periods for that pixel. If the data word is the number 55, the laser will be on for 13 of the 64 periods for that pixel. If the data word is the number 1, then the laser will be on for 63 periods out of 64 for that particular pixel.

This is also shown graphically in FIG. 5. If the data is the number 63, the laser is on for only one period illustrated by one pulse and the rest of the time is off. Therefore the laser does not discharge the photoreceptor and the resultant pixel will be black. If the data number is 62, the laser will be on for 2/64 of the available time periods and if the data number is 61, the laser will be on for 3/64 of the available time periods. It should be noticed that the data word 61 is represented by four pulses. These pulses in effect represent the 40 megahertz frequency and this number of pulses corresponds to a time period of 3/64. This accounts for the uneven line in FIG. 4 rather than a straight line relating data word numbers to pulse periods.

Thus, as the data word from the host computer becomes progressively lower, the laser is modulated or turned on a greater percentage of the time period for that particular pixel. The photoreceptor becomes more and more discharged for a particular pixel and the pixels become less and less dark. At the other extreme, with the number zero, the laser is on the full pixel period completely discharging the photoreceptor and providing a white pixel.

In operation, with reference to FIG. 3, a six bit word is brought up from the controller 28 through the data input gates 72 onto data bus 58 and loaded into the six bit counter 60 in the modulating circuitry 56. The significance of the divide by sixty four circuitry 54 is to give the 64 halftone periods or states for each pixel. Since each pixel has 64 possible periods or states that the laser can be turned on, we need clock intervals that are 64 times higher.

The divide by sixty four circuitry 54 includes the counter 74 and AND gate 76 providing a "load data now" (LDN) signal to the counter 60. In particular, the output of the AND gate 76 drops low to signal the loading of data words from the data bus 58 into the counter 60. In addition, there is a data clock signal provided once per pixel from counter 74. This data clock signal along with line sync, page sync, and ready signals are provided to controller 28 to synchronize the loading of data words onto bus 58 to counter 60. The line sync signal tells the controller that data is wanted and the clock signal tells the computer to send the data at the data clock rate. The page sync signal tells the computer that there is the beginning of a page. When the load data now signal is low, once per pixel, a data word is loaded into the counter 60. Also once per pixel, the data clock signal is received by the controller to clock out the data.

A six bit data word for each pixel representing a number from 0–63 is loaded into the counter 60. This identifies the degree of greyscale for that particular pixel. For example, if the number 50 is loaded into the counter 60, the counter will begin counting from 50, i.e. 51, 52 . . . 63. The counts in the counter represent the time period that the modulator is on. Thus, for a count of 50, the counter will count 13 and the modulator will be on for a period of 13 states for that particular pixel.

The signal to the modulator 24 is the output signal from AND gate circuitry 78. The three essential inputs to the AND gate circuitry 78 are the line sync signal, the 40 megahertz signal, and the video signal representing the time period for activation of the laser modulator. The video signal is the output from the flip-flop 80 interconnected to AND gate circuitry 78. The two essential inputs to the flip-flop 80 are the output of the counter 60 and the load new data signal from the AND gate 76. The output signal as shown is then conveyed to the laser modulator 24.

For testing, there is provided a step wedge generator 62. This generator includes three four bit counters, 82, 84 and 86. These counters are connected to the data bus 58 through a suitable connector and automatically provide a count from 0–63 to counter 60 to provide a test document for each greyscale value to monitor the system. An alternative test system is a switch 64, a six bit test switch that is manually set to provide a test document for one particular greyscale value. This switch is also suitably connected to the data bus 58 and to the counter 60.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. In a one dimensional electronic halftone screening method wherein sequentially generated pictorial signals are representative of a number of pixel positions in a plurality of scan lines to define an original image and wherein synchronously generated halftone screen signals are representative of halftone values for each pixel position in each scan line, the method of producing a halftone image including the steps of
   providing a digital word representative of the discrete greyscale value for each pixel,
   storing the digital data word in a counter,
   activating the counter to produce a count representative of the value of the pixel greyscale,
   converting the count into a variable pulse width, and
   activating a modulator in response to the pulse width to provide the greyscale value for each pixel whereby a line screen of pixel elements is provided.

2. Apparatus for the raster reproduction of line halftone pictures comprising:
   a source of digital data representative of a discrete level of pixel greyscale,
   a counter to store the digital data wherein the counter begins counting from the number representative of the greyscale,
   a laser modulator,
   means responsive to the count in the counter to provide a variable pulse to the laser modulator,
   a clock generator to synchronize the laser modulator,
   logic means to provide a clock signal to initiate the operation of the counter, and
   pulse producing logic responsive to the counter to activate the laser modulator in accordance with the digital data representative of the discrete level of pixel greyscale.

3. Apparatus for the rater reproduction of line halftone pictures comprising:
   a source of digital data representative of a discrete level of pixel greyscale,
   a counter to store the digital data,
   a step wedge generator connected to the counter for providing a test document representative of each of the various greyscale values,
   a laser modulator,
   a clock generator to synchronize the laser modulator,
   logic means to provide a clock signal to initiate the operation of the counter, and
   pulse producing logic responsive to the counter to activate the laser modulator in accordance with the digital data representative of the discrete level of pixel greyscale.

4. Apparatus for the raster reproduction of line halftone pictures comprising:
   a source of digital data representative of a discrete level of pixel greyscale,
   a counter to store the digital data,
   a laser modulator,
   a clock generator to synchronize the laser modulator,
   logic means to provide a clock signal to initiate the operation of the counter,
   pulse producing logic responsive to the counter to activate the laser modulator in accordance with the digital data representative of the discrete level of pixel greyscale, and
   a test switch for manually providing a greyscale value to the counter for test purposes.

* * * * *